(12) United States Patent
Lee et al.

(10) Patent No.: US 8,599,552 B2
(45) Date of Patent: Dec. 3, 2013

(54) HEAT RADIATING STRUCTURE IN ALL-IN-ONE COMPUTERS

(75) Inventors: Chun-Yi Lee, New Taipei (TW); Hsien-Tang Liu, New Taipei (TW); Kang Ku, New Taipei (TW)

(73) Assignee: Datavan International Corp., New Taipei (TW)

( * ) Notice: Subject to any disclaimer, the term of this patent is extended or adjusted under 35 U.S.C. 154(b) by 213 days.

(21) Appl. No.: 13/306,822

(22) Filed: Nov. 29, 2011

(65) Prior Publication Data

US 2013/0135814 A1 May 30, 2013

(51) Int. Cl.
*G06F 1/20* (2006.01)
*G06F 1/16* (2006.01)
*H05K 7/20* (2006.01)

(52) U.S. Cl.
USPC ............ 361/679.54; 361/679.02; 361/679.33; 361/690; 361/692; 361/715; 165/80.3; 165/104.33

(58) Field of Classification Search
USPC ............. 361/679.02, 679.21, 679.32, 679.33, 361/679.46–679.55, 688, 689, 690–697, 361/704–715, 721–727; 165/80.2–80.5, 165/104.14, 104.26, 104.33, 121–127, 185; 312/223.1, 223.2, 223.3, 236, 265; 454/184; 257/712, 715, 722; 174/15.1, 174/16.3, 50, 520; 248/917–923, 230, 248/223.6, 223.41, 225.1
See application file for complete search history.

(56) References Cited

U.S. PATENT DOCUMENTS

| 5,794,214 | A | * | 8/1998 | Ebina et al. ..................... 705/24 |
| 5,973,922 | A | * | 10/1999 | Kamphuis ..................... 361/704 |
| 6,053,410 | A | * | 4/2000 | Wike et al. ............... 235/462.43 |
| 6,504,711 | B2 | * | 1/2003 | Wu et al. .................. 361/679.47 |
| 6,532,152 | B1 | * | 3/2003 | White et al. ..................... 361/692 |
| 7,394,653 | B2 | * | 7/2008 | Cheng et al. ............ 361/679.48 |
| 7,652,875 | B2 | * | 1/2010 | Tsuchida ................. 361/679.21 |
| 8,248,780 | B2 | * | 8/2012 | Zheng et al. ............. 361/679.47 |
| 8,248,785 | B2 | * | 8/2012 | Guan ....................... 361/679.52 |
| 8,254,096 | B2 | * | 8/2012 | Liao et al. ................ 361/679.02 |
| 8,395,890 | B2 | * | 3/2013 | Hsieh et al. .............. 361/679.47 |
| 8,456,829 | B2 | * | 6/2013 | Chen et al. ............... 361/679.33 |
| 2005/0168935 | A1 | * | 8/2005 | Inoue et al. .................... 361/685 |
| 2010/0309624 | A1 | * | 12/2010 | Yeh et al. ................. 361/679.48 |
| 2011/0176268 | A1 | * | 7/2011 | Kuang et al. ............. 361/679.22 |

* cited by examiner

*Primary Examiner* — Michail V Datskovskiy
(74) *Attorney, Agent, or Firm* — Muncy, Geissler, Olds & Lowe, PLLC (57) ABSTRACT

The present invention relates to a heat radiating structure in all-in-one computers, comprising a pedestal, mainframe module and back cover. The mainframe module is contained in a containing stand behind the pedestal, and a motherboard is included in the containing space in front of a mainframe module base. The motherboard's CPU sticks through a radiator to a heat radiating aluminum plate in the rear of the containing space, while the hard disk drive is close to the heat radiating aluminum plate, and the pedestal is covered by the back cover on the back. With the heat radiating aluminum plate to quickly conduct heat and its multiple heat radiating holes, heat dispersing holes behind the containing stand and hollowed grooves on the back cover to convect hot air.

7 Claims, 7 Drawing Sheets

HEAT RADIATING STRUCTURE IN ALL-IN-ONE COMPUTERS

BACKGROUND OF THE INVENTION

1. Field of the Invention

The present invention relates to a heat radiating structure in all-in-one computers, particularly to the structure that makes CPU radiators press against heat radiating aluminium plates behind bases of mainframe modules and heat radiating aluminium plates keep close to hard drives for heat conduction, so as to realize convection with external cool air to cool down all-in-one computers through multiple heat radiating holes on the heat radiating aluminium plates, multiple heat dispersing holes on the pedestal and multiple hollowed grooves on the back cover.

2. Description of the Related Art

Popularized computers and networks are not only available in offices or homes, but also in places such as stores and restaurants. Nowadays, the retail industry turns to the chain system, responding to different users' needs and making continuous R&D efforts and improvements, and commonly-used systems currently include those of POS (Point on Sale), EOS (Electronic Order System) and CAO (Computer Assistant Order). These systems can be used in payments, sales, bar code scanning, invoicing, receipting or ordering, to provide the latest updates, product information and membership information, or even for processing of sale analysis, etc. Since these systems help save a lot of manpower and time, computers can be seen everywhere in our life.

Yet computers cannot display information directly, and related information is only available on displays for users or customers, so a computer is usually equipped with a mainframe and a display. However, as the mainframe and display needs room for installation and customers tend to attach importance on lightness, thinness, shortness and minimization of products, the computer consisting of a mainframe and a display conventionally will not satisfy customers' needs. In view of this, some firms make continuous efforts in R&D and launch all-in-one computers that include electronic components of mainframes in a display. As a main trend, liquid crystal displays (LCD) are mostly installed on one side of all-in-one computer cases. To secure the maximum visual area, most of LCD displays are made usually in accordance with dimensions of computer cases as much as possible. This requires the motherboard and electronic components installed whereon (e.g. hard disk drives, CD drivers, heat sinks, cooling fans, memories, connectors, memory cards, etc.) to be placed in order on the back of the LCD display, so that the LCD display can be installed into an all-in-one computer case after these components overlap. Such overlapping structure design allows all-in-one computer to reduce in dimension, but does not solve the problem of high temperature that originally occurs in working computers, and too high temperature may lead to shutdown of computers. Because the dimensions of all-in-one computers reduce but not the number of electronic components, the space inside the LCD display reduces accordingly. This leads to shorter distance between components that emit a lot of heat while working, such as the LCD display, CPU and hard disk drive, and makes it difficult to cool down, causing problems of shutdown frequently. In addition, since electronic components such as the CPU, heat sink and cooling fan overlap in the same position on the motherboard, causing the thickness of the all-in-one computer unable to reduce, the disadvantage of large dimensions occurs in all-in-one computers.

Thus, how to overcome the problems and advantages of poor heat radiation and large dimensions of all-in-one computers is what the firms engaged in this field need urgently to research and improve.

SUMMARY OF THE INVENTION

In view of aforesaid problems and disadvantages of the heat radiating structure in conventional use, the inventor has collected related information, conducted assessments and taken considerations in many aspects, and based on his experience of many years in this field, has finally invented a heat radiating structure in all-in-one computers following continuous trials and corrections.

The primary object of the present invention is to make the CPU on the motherboard of the mainframe module press against the H-shaped radiator and make the other side of the radiator directly press against the heat radiating aluminium plate of the base, allowing heat to be conducted quickly from the CPU to the heat radiating aluminium plate, while the hard disk drive keeps close to the heat radiating aluminium plate, thus ensuring that not only the heat radiating aluminium plate itself can be used to conduct and transfer heat very quickly, but also multiple heat radiating holes can be used for convection of hot air. This makes it unnecessary to install heat sinks and fans, hence saving the space for installation, and further helps reduce production costs and dimensions of products under the condition of sound heat radiation.

The secondary object of the present invention is to establish a pedestal which includes a containing stand to contain the mainframe module in its containing trough and help transfer heat by two-side air convection through multiple heat dispersing holes of the containing stand, so as to convey heat from the CPU, hard disk drive or other components on the motherboard to the heat radiating aluminium plate for convection of hot air with external cool air to lower the temperature through multiple heat dispersing holes and multiple hollowed grooves, thus achieving the purpose of actual and quick heat radiation.

DETAILED DESCRIPTION OF THE PREFERRED EMBODIMENT

To achieve the aforesaid objects and functions as well as the techniques adopted in the present invention and its fabrication, examples of the preferred embodiment of the present invention are given below to illustrate its features and functions in detail by referring to the accompanying drawings.

Refer to FIGS. 1, 2, 3, 4, 5, 6 and 7, which respectively show three-dimensional appearance and decomposition drawings of the mainframe module, three-dimensional appearance drawings of the pedestal and mainframe module prior to and following assembly, a side-view sectional drawing of the pedestal and mainframe module following assembly and three-dimensional appearance drawings of the back cover prior to and following assembly according to the present invention. As shown clearly in these figures, the heat radiating structure in all-in-one computer comprises a pedestal 1, a mainframe module 2 and a back cover 3, wherein:

There is a containing trough 10 to contain a display module 101 in the front of the pedestal 1 and a containing stand 11 in the rear of the pedestal 1. Inside the containing stand 11, there is a containing cell 110 with an opening 111 connecting to the outside on one side, and multiple rails 112 extending from the inside of the containing cell 110 to its opening 111 are installed prominently on left and right side walls of the containing cell 110. Multiple heat dispersing holes 113 are established through the back of the containing stand 11, and an extension plate 12 with one or more locking holes 121 is established extending from the bottom of the containing stand 11 of the pedestal 1.

The mainframe module 2 includes a base 21 and a motherboard 22, wherein the base forms a containing space 210 in the front, and a heat radiating aluminium plate 211 filled with multiple heat radiating holes 2111 is installed to the rear of the containing space 210. Moreover, multiple locating holes 2112 are set on the heat radiating aluminium plate 211 outside the multiple heat radiating holes 2111 for the fixing components 2113 to lock in, and multiple rail strips 2114 sliding up and down on multiple rails 112 are fabricated prominently on left and right side walls of the base 21. A back plate 212 is installed at the bottom of the containing space 210 and includes multiple through holes 2121 and multiple through grooves 2122 arranged in the rear of the multiple through holes 2121. Then, the front side walls of the back plate 212 bend downwards to form a locating plate 213, and a handle 2131 is established at the end of the locating plate 213. Through the locating plate 213, one or more through holes 2132 are set for the locking components 2133 to get through and fasten into the locking holes 121 of the pedestal 1. The motherboard 22 is installed inside the containing space 210, and is equipped with a CPU 221 at the center of its surface adjacent to the heat radiating aluminium plate 211, while an H-shaped radiator 222 is installed on the motherboard 22, with its front and back surfaces exposed to the CPU 221 and the heat radiating aluminium plate 211 respectively, and may be covered with the bent heat pipes 223 which press against the front and back surfaces of the H-shaped radiator 222. A display chip 224 and a memory 225 are installed to the left and right sides of the CPU 221 on the motherboard 22, and multiple connection ports 226 are set at the bottom of the motherboard 22 to match the multiple through holes 2121 on the back plate 212. Then, a fixing bracket 227 is arranged to the rear of the multiple connection ports 226 and fastened into the multiple through grooves 2122 of the back plate 212 to place a hard disk drive 228, making the hard disk drive 228 close to the heat radiating aluminium plate 211 and allowing the H-shaped radiator 222, multiple connection ports 226 and the hard disk drive 228 to face the multiple heat radiating holes 2111 of the heat radiating aluminium plate 211. And multiple fixing holes 229 are established on the motherboard 22 to face the locating holes 2112 for the fixing components 2113 to be fastened.

Figure 6:
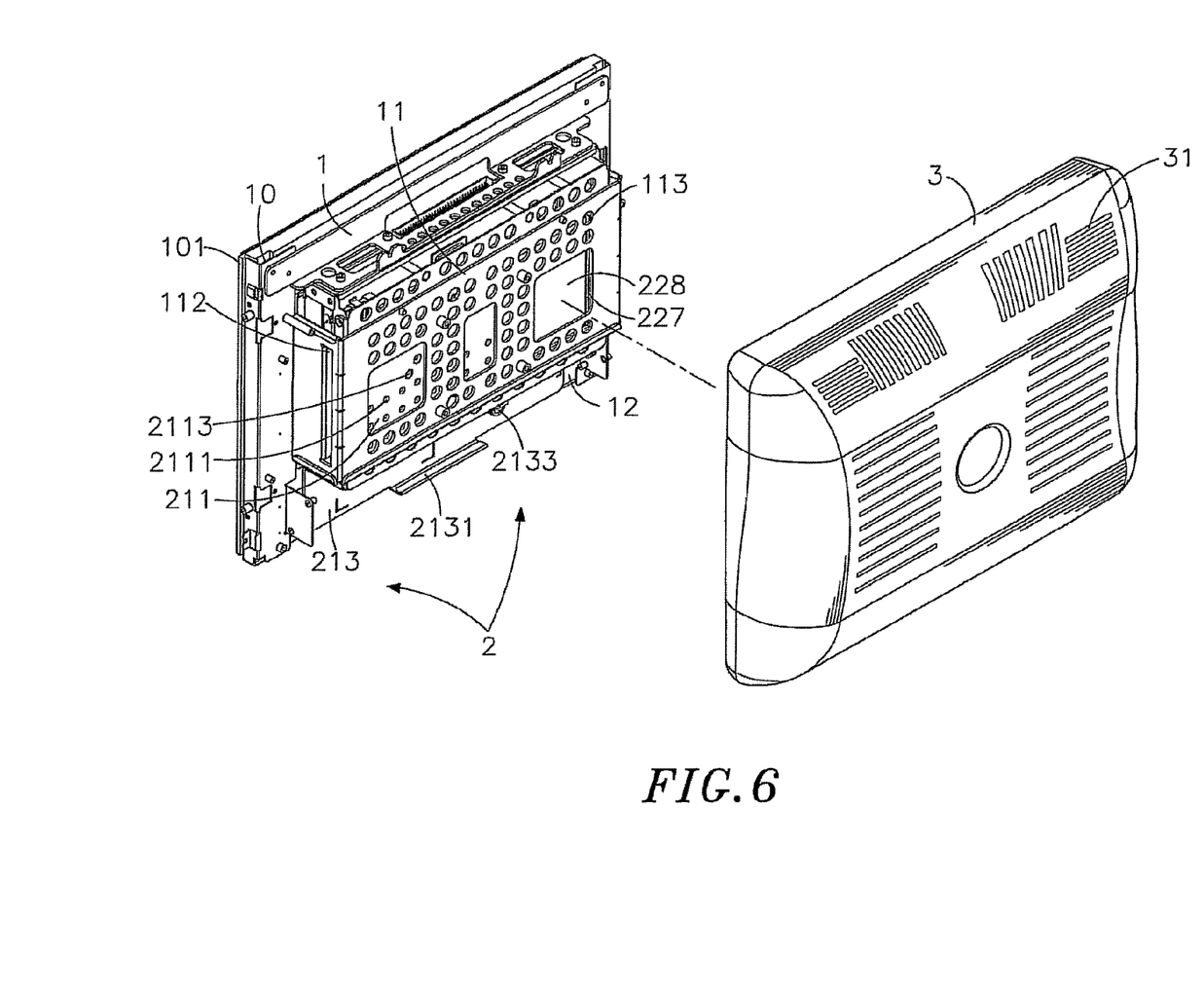
FIG. 6 is a three-dimensional appearance drawing of the back cover prior to assembly according to the present invention.
Figure 7:
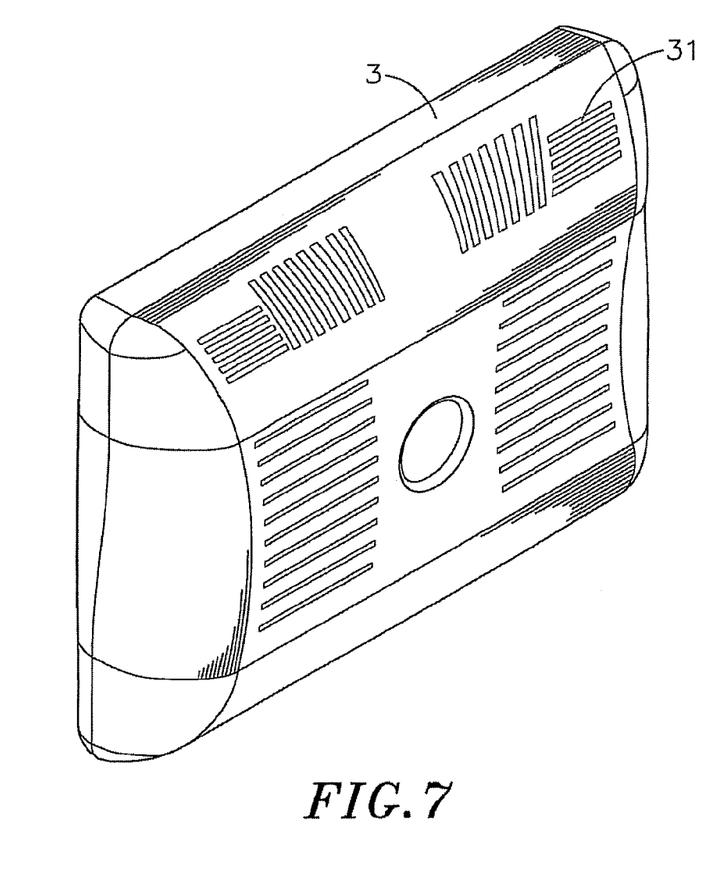
FIG. 7 is a three-dimensional appearance drawing of the back cover following assembly according to the present invention.

The back cover 3 covers the back of the pedestal 1 and contains multiple hollowed grooves 31.

In the above descriptions, the fixing components 2113 may be screws or cramps and the locking components 2133 may be screws, so long as these components can be disassembled and assembled following fixation. They shall not be construed as limiting the appended patent claims of the present invention, and it is hereby stated that all modifications and other equivalent changes made without departing from the spirit and art of the present invention shall be included in the patent claims of the present invention.

For assembly of the aforesaid components, install the hard disk drive 228 using the fixing bracket 227 into the through grooves 2122 of the back plate 212 at the bottom of the base 21, and connect the hard disk drive 228 electrically with the motherboard 22 through a connection wire. Then, install the motherboard 22 together with the CPU 221, the H-shaped radiator 222, the bent heat pipes 223, the display chip 224, the memory 225 and multiple connection ports 226 into the containing space 210 of the base 21, and lock the fixing components 2113 into the multiple locating holes 2112 established on the heat radiating aluminium plate 211 in the rear of the base 21, so as to fasten into the multiple fixing holes 229 on the motherboard 22 through the fixing components 2113. Place the mainframe module 2 from the opening 111 of the containing stand 11 in the rear of the pedestal 1 into the containing cell 110, making the multiple rail strips 2114 on the left and right sides of the base 21 press against the multiple rails 112 set on the left and right sides of the containing trough 10, so that the base 21 is guided into a given position in the containing cell 110. At this moment, fasten the mainframe module 2 into one or more locking holes 121 on the extension plate 12 of the pedestal 1 into through getting the locking components 2133 into one or more through holes 2132 on the locating plate 213, install the display module 101 in the containing trough 10 of the pedestal 1 and fix the back cover 3 in the rear of the pedestal 1, then the assembly is completed.

The above descriptions are given only to illustrate the assembly of the mainframe module 2 in detail. However, assemblies of the display module 101 and the back cover 3, and fixing components and connection wires may be accomplished by making use of the prior art, and do not constitute the major parts of the present invention. Therefore, it is not necessary to give detailed descriptions in such regard any more.

Refer to FIGS. 1, 2, 3, 4, 5 and 6, which are respectively three-dimensional appearance and decomposition drawings of the mainframe module, three-dimensional appearance drawings of the pedestal and mainframe module prior to and following assembly, a side-view sectional drawing of the pedestal and mainframe module following assembly and a three-dimensional appearance drawing of the back cover prior to assembly according to the present invention. As shown clearly in these figures, the CPU 221 on the motherboard 22 is nestled closely against the front surface of the H-shaped radiator 222, while the rear surface of the H-shaped radiator 222 is nestled closely against the heat radiating aluminium plate 211. Besides, the hard disk drive 228 is fastened by the fixing bracket 227 onto the side approaching the heat radiating aluminium plate 211 of the back plate 212. Thus, thermal energy from the CPU 221 can be transferred directly to the heat radiating aluminium plate 211 through the H-shaped radiator 222. And thermal energy from the hard disk drive 228 in the proximity of the heat radiating aluminium plate 211 can also be conducted to the heat radiating aluminium plate 211 through air. As the H-shaped radiator 222 and the hard disk drive 228 corresponds respectively to one or more heat radiating holes 2111 on the heat radiating aluminium plate 211, these holes allow hot air to convect outwardly to accelerate the cooling speed.

Figure 1:
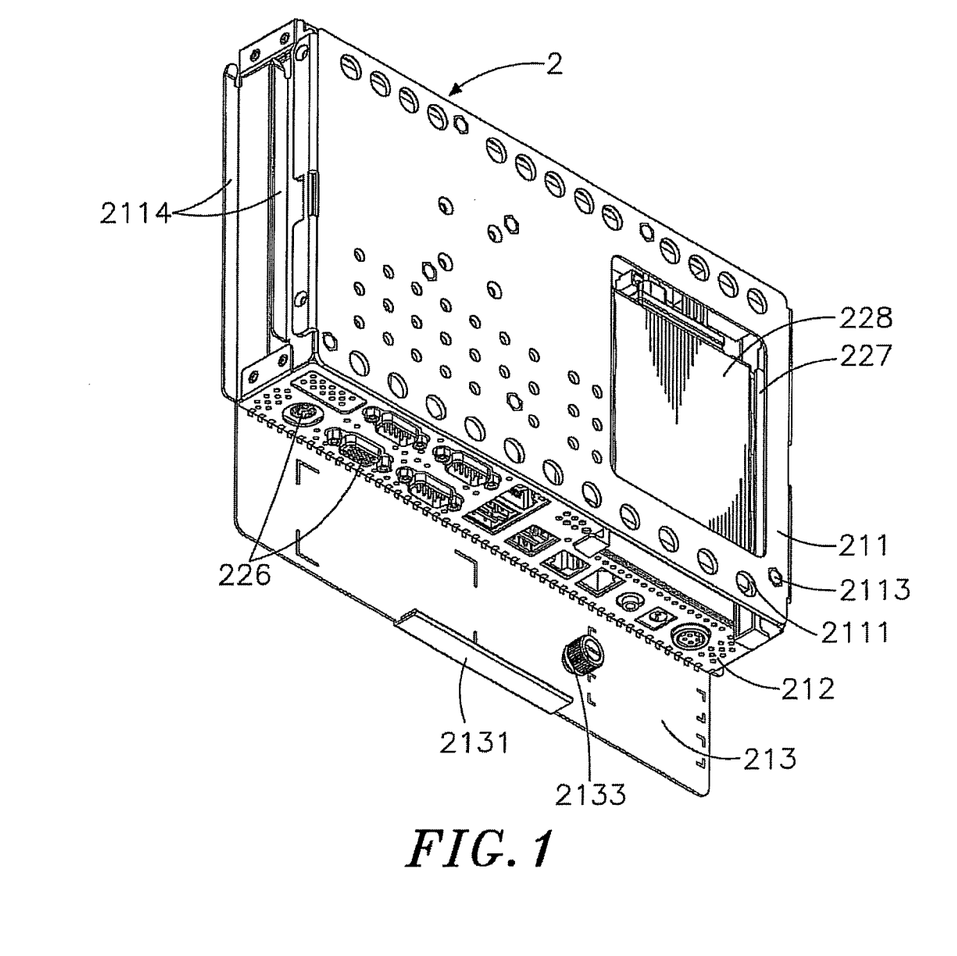
FIG. 1 is a three-dimensional appearance thawing of the mainframe module according to the present invention.
Figure 2:
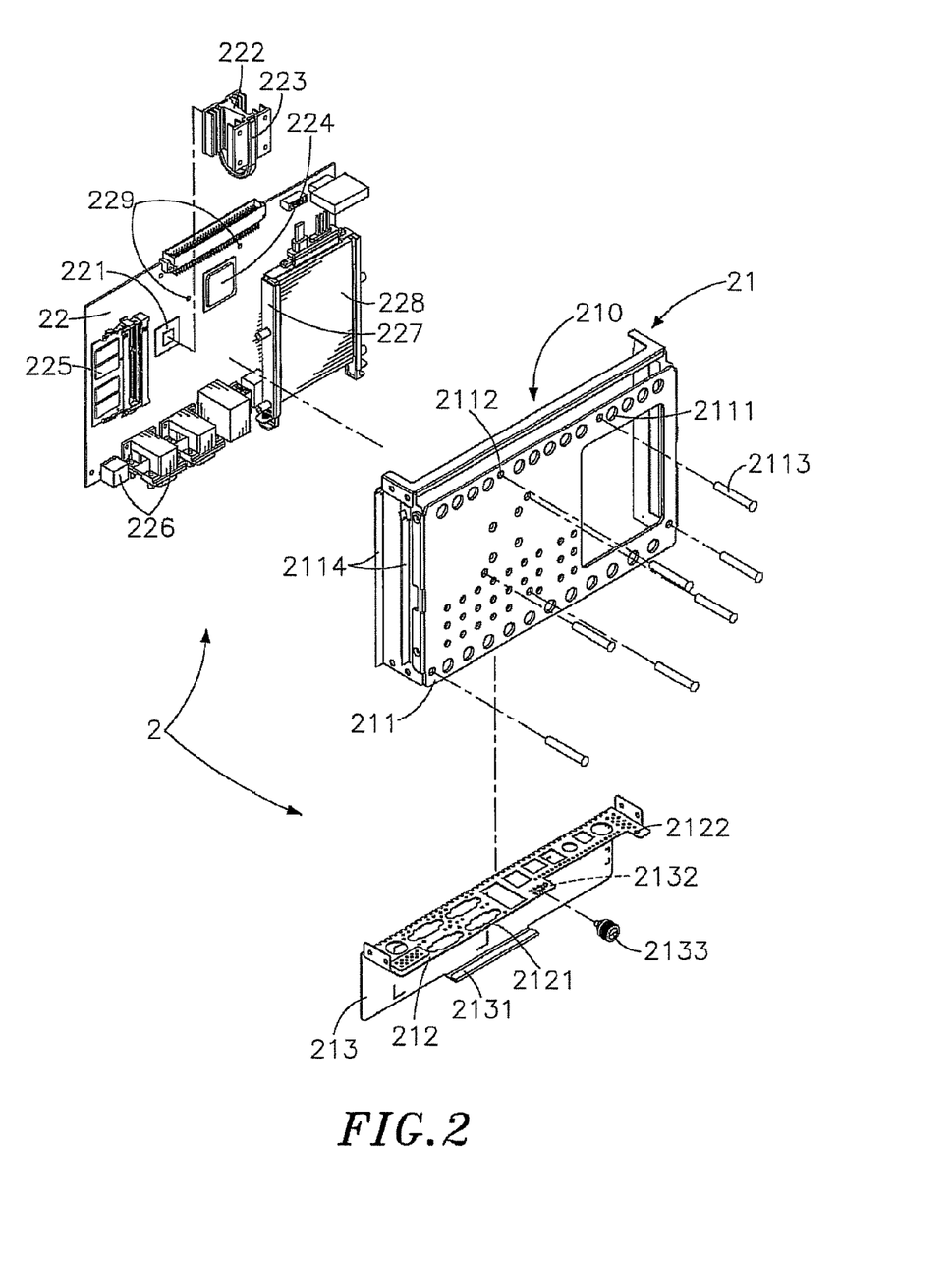
FIG. 2 is a three-dimensional decomposition drawing of the mainframe module according to the present invention.
Figure 3:
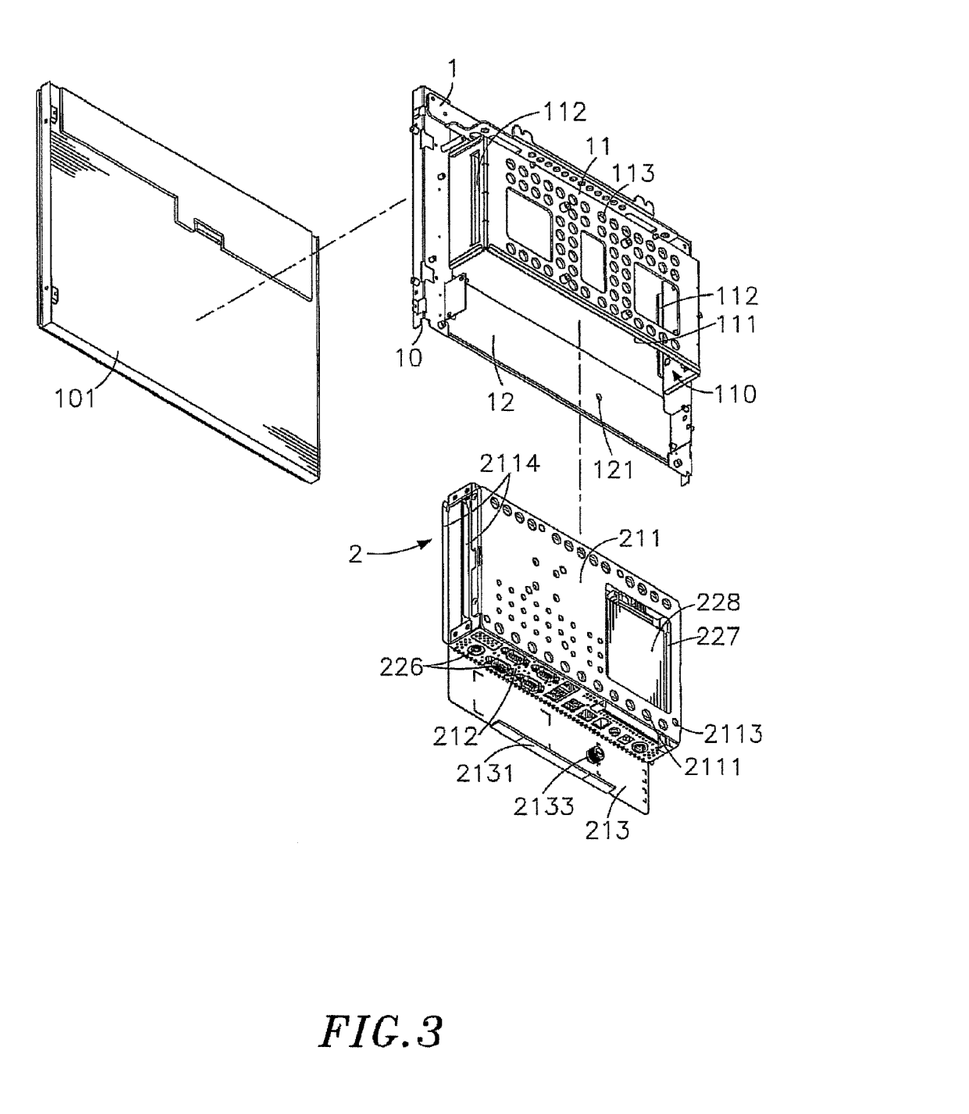
FIG. 3 is a three-dimensional appearance drawing of the pedestal and mainframe module prior to assembly according to the present invention.
Figure 4:
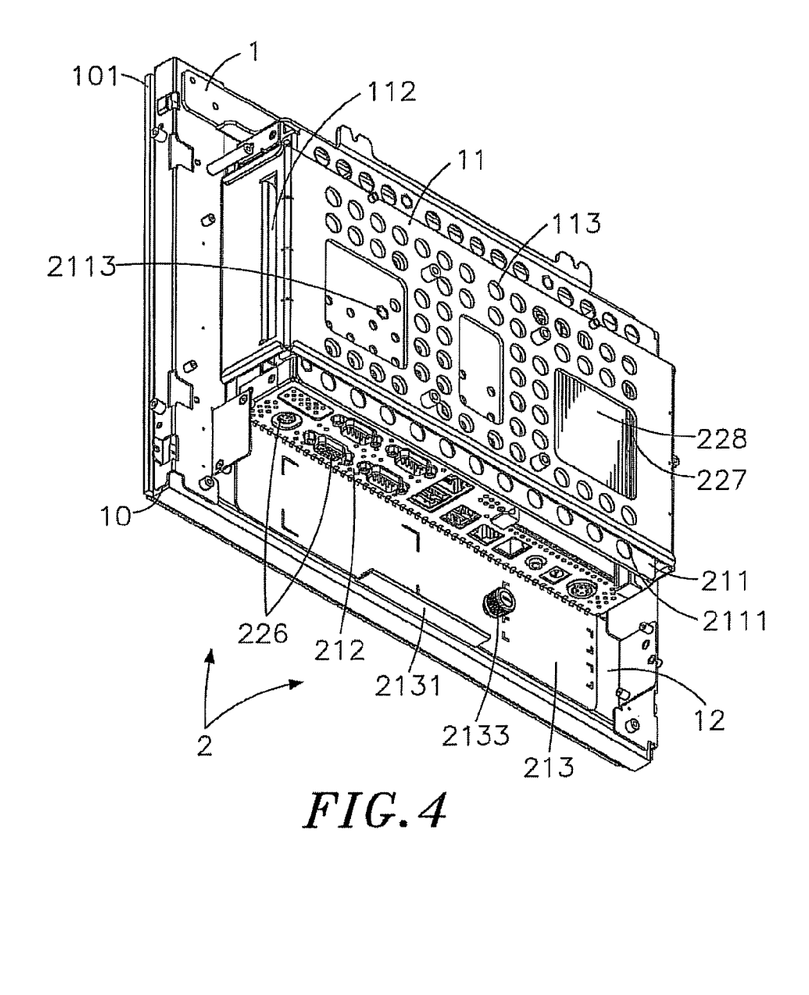
FIG. 4 is a three-dimensional appearance drawing of the pedestal and mainframe module following assembly according to the present invention.
Figure 5:
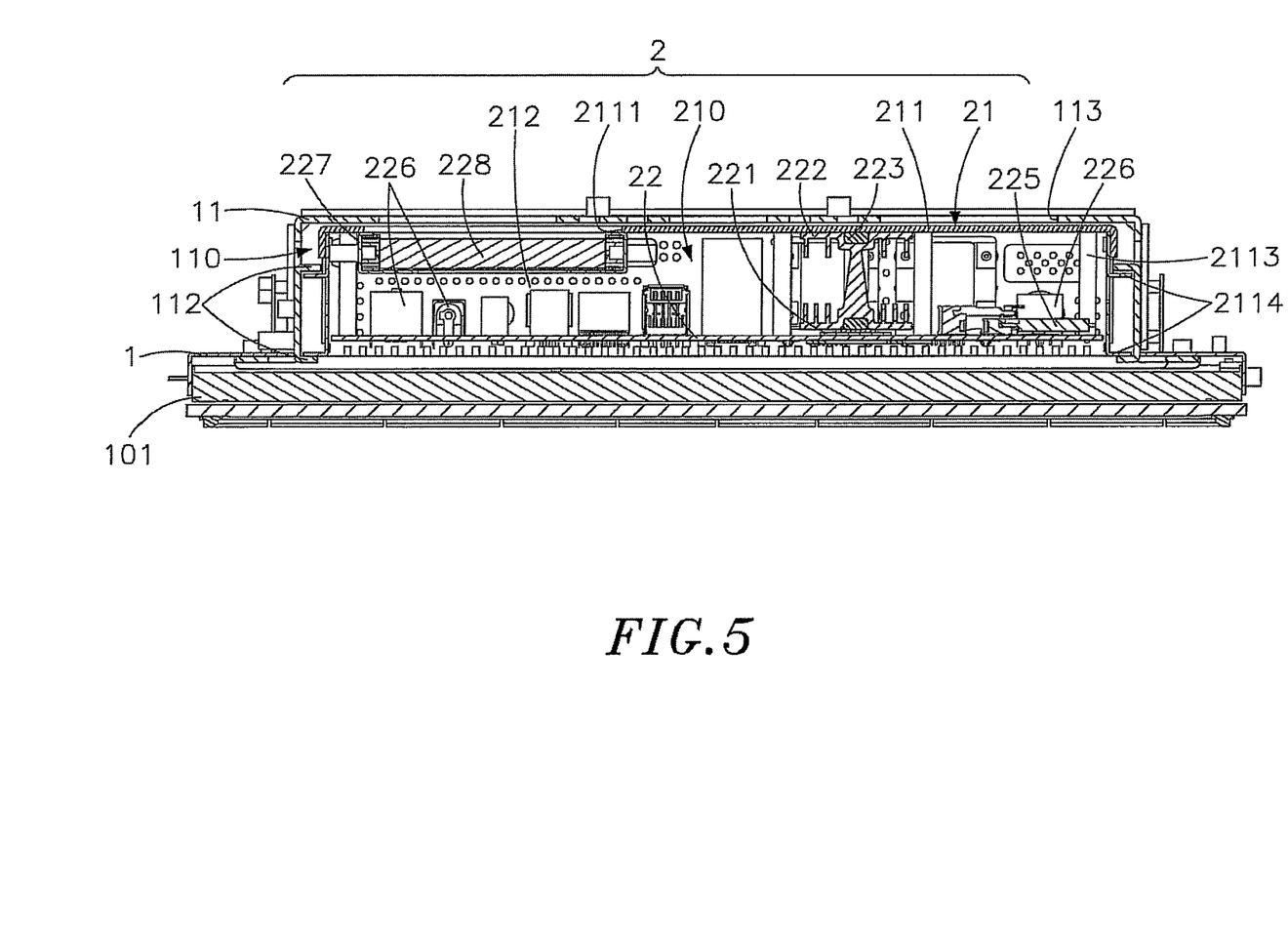
FIG. 5 is a side-view sectional drawing of the pedestal and mainframe module following assembly according to the present invention.

Additionally, as the mainframe module 2 is installed in the containing cell 110 of the containing stand 11 of the pedestal 1 while the multiple heat dispersing holes 113 pass through the back of the containing stand 11, and the back cover 3 covering the back of the pedestal 1 includes the multiple hollowed grooves 31, these heat dispersing holes 113 will allow backward air convection of heat from the heat radiating aluminum plate 211, and the multiple hollowed grooves 31 can be used to exchange internal hot air with outside cool air to achieve the effect of quick cooling. Since it's not necessary to install a lot of heat sinks and cooling fans inside, the number of computers' components can be reduced without causing overheat, thus achieving the purposes of reduced production costs and miniaturized product dimensions.

When applied practically, the heat radiating structure in all-in-one computers as disclosed in the present invention has the following advantages:

(1) the heat radiating aluminium plate 211 on the base 21 of the mainframe module 2 can be used for direct heat conduction and radiation, and thermal energy from the CPU 221 can be quickly transferred to the heat radiating aluminium plate 211 by directly nestling the H-shaped radiator 222 against the CPU 221 and the heat radiating aluminium plate 211 on the motherboard 22. Besides, thermal energy from the hard disk drive 228 can be conducted by air to adjacent the heat radiating aluminium plate 211, or the multiple heat radiating holes 2111 on the heat radiating aluminium plate 211 can be used for convection of hot air. Since heat can be dissipated through the heat radiating aluminium plate 211 and the heat radiating holes 2111 without installing a lot of heat sinks and cooling fans inside, it helps reduce the number of components to be installed inside and the space for installation.

(2) the mainframe module 2 is included in the containing cell 110 of the containing stand 11 of the pedestal 1, and the multiple heat dispersing holes 113 of the containing stand 11 enable convection of air from both sides to assist with cooling, while the multiple hollowed grooves 31 on the back cover 3 are used for convection of external air. This allows high heat from the CPU 221, the hard disk drive 228 or other components installed on the motherboard 22 to be transferred to the heat radiating aluminium plate 211, thus enabling convection of generated hot air with external cool air for cooling and further achieving the purpose of cooling down computers.

Thus, the present invention chiefly involves a heat radiating structure in all-in-one computers with a view to reducing temperature, production costs and miniaturizing product dimensions, in which high heat can be transferred by the H-shaped radiator 222 from the CPU 221 on the motherboard 22 to the heat radiating aluminium plate 211, and thermal energy can be conducted from the hard disk drive 228 to the heat radiating aluminium plate 211 or convected through the multiple heat radiating holes 2111 of the heat radiating aluminium plate 211 and further exchanged with external cool air through the multiple heat dispersing holes 113 in the rear of the containing stand 11 of the pedestal 1 and multiple hollowed grooves 31 of the back cover 3, due to proximity of the hard disk drive 228 to the heat radiating aluminium plate 211. However, the aforesaid descriptions are given only to illustrate preferred embodiments of the present invention, and shall not be construed as limiting the appended patent claims of the present invention. Therefore, it is hereby stated that all modifications and other equivalent changes made without departing from the spirit and art of the present invention shall be included in the patent claims of the present invention.

In summary, the heat radiating structure in all-in-one computers as disclosed in the present invention can achieve its functions and objects when applied practically. Therefore, the present invention is really an excellent one with practical applicability and can satisfy the terms and conditions for patentability of a utility model. While the application of patent is filed pursuant to applicable laws, your early approval will be highly appreciated so as to guarantee benefits and rights of the inventor who has worked hard at this invention. For any question, please do not hesitate to inform the inventor by mail, and the inventor will try his best to cooperate with you.

What the invention claimed is:

1. A heat radiating structure in all-in-one computers, comprising a pedestal, a mainframe module and a back cover, wherein:

a containing trough is fabricated in the front of the pedestal for a display module to be placed in, and a containing stand is placed in the rear of the pedestal; there is a containing cell with one of its openings connecting outwards inside the containing stand, and multiple heat dispersing holes pass through the rear of the containing stand;

the mainframe module consists of a base and a motherboard, and a containing space is formed in the front of the base to contain the motherboard; a heat radiating aluminium plate filled with multiple heat radiating holes is installed to the rear of the containing space, and a back plate is installed at the bottom of the containing space and includes multiple through holes and multiple through grooves arranged in the rear of the multiple through holes; there are a CPU and a H-shaped radiator, whose front and rear surfaces are respectively nestled against the CPU and heat radiating aluminium plate, installed at the center of the motherboard' surface close to the heat radiating aluminium plate; the motherboard is equipped with a display chip and a memory respectively on left and right sides of the CPU; multiple connection ports are installed at the bottom of the motherboard to match the multiple through holes on the back plate, and a fixing bracket is arranged to the rear of the multiple connection ports and fastened into the multiple through grooves of the back plate to place a hard disk drive, in which the hard disk drive is close to the heat radiating aluminium plate; the H-shaped radiator, multiple connection ports and the hard disk drive are arranged to face the multiple heat radiating holes on the heat radiating aluminium plate;

the back cover covers the back of the pedestal and contains multiple hollowed grooves connecting from inside to the outside for air convection.

2. The heat radiating structure in all-in-one computers according to claim 1, wherein multiple rails extending from the inside of the containing cell to its opening are installed prominently on left and right side walls of the containing cell, while multiple rail strips extending and sliding up and down on the multiple rails are established prominently on left and right side walls of the base of the mainframe module.

3. The heat radiating structure in all-in-one computers according to claim 1, wherein an extension plate with one or more lockholes is established extending from the bottom of the containing stand of the pedestal, and the front side walls of the back plate bend downwards to form a locating plate; through the locating plate, one or more through holes are set for locking components to get through and fasten into the locking holes of the pedestal.

4. The heat radiating structure in all-in-one computers according to claim 3, wherein a handle is established at the end of the locating plate.

5. The heat radiating structure in all-in-one computers according to claim 1, wherein multiple locating holes are set on the heat radiating aluminium plate outside the multiple heat radiating holes for fixing components to lock in, and multiple fixing holes are established on the motherboard to match the locating holes for the fixing components to be fastened.

6. The heat radiating structure in all-in-one computers according to claim 1, wherein the H-shaped radiator of the mainframe module may be covered with bent heat pipes which press against the front and back surfaces of the radiator.

7. The heat radiating structure in all-in-one computers according to claim 1, wherein the radiator is H-shaped.

\* \* \* \* \*